United States Patent [19]

Herrando Villanueva

[11] Patent Number: 4,598,532
[45] Date of Patent: Jul. 8, 1986

[54] APPARATUS FOR FORMING FLAT ELEMENTS, SUCH AS TILES, INTO PACKAGES

[76] Inventor: Eliseo Herrando Villanueva, C/Cid, s/n.- Polígono Torrubero, Museros (Valencia), Spain

[21] Appl. No.: 509,225

[22] Filed: Jun. 28, 1983

[30] Foreign Application Priority Data

Mar. 10, 1983 [ES] Spain .................................. 270.789

[51] Int. Cl.⁴ ..................... B65B 27/08; B65B 35/30
[52] U.S. Cl. ..................................... 53/542; 53/544; 198/374; 198/410; 198/408; 198/412
[58] Field of Search ............... 198/374, 410, 412, 461, 198/604, 627, 408; 414/38, 107, 103; 271/149–151, 216; 53/589, 582, 542, 544

[56] References Cited

U.S. PATENT DOCUMENTS

| | | | |
|---|---|---|---|
| 3,386,558 | 6/1968 | Benatar | 198/408 |
| 3,973,673 | 8/1976 | Ahluwalia | 198/374 |
| 4,156,482 | 5/1979 | Tomlinson et al. | 414/103 |
| 4,164,996 | 8/1979 | Tomlinson | 198/462 |
| 4,230,218 | 9/1980 | Kunzmann | 198/604 |
| 4,292,785 | 10/1981 | Hammond | 53/589 |
| 4,427,145 | 1/1984 | Harris | 414/105 |

FOREIGN PATENT DOCUMENTS

| | | | |
|---|---|---|---|
| 2145599 | 5/1972 | Fed. Rep. of Germany | 198/408 |
| 929480 | 5/1963 | United Kingdom | 198/374 |

*Primary Examiner*—Joseph E. Valenza
*Assistant Examiner*—D. Glenn Dayoan
*Attorney, Agent, or Firm*—Wenderoth, Lind & Ponack

[57] ABSTRACT

An improved packaging apparatus includes a linear conveyor belt above which there is mounted an automatic reciprocating turning device which turns flat elements moved by the conveyor. At the end of travel of the conveyor, there is a clamp loader which presses the flat elements and transfers them from a horizontal position to a vertical position, dropping them in this position onto a horizontal dual conveyor, whereby they are displaced with an intermittent forward movement. The elements are faced in pairs and grouped in quantitatively scheduled packages, until they are deposited on a roller table to group various laterally faced packages and to obtain a scheduled volume for the packaging thereof. The upper belt of the horizontal dual conveyor moves at the same speed as the belts below it and maintains the members forming the package in a vertical orientation. The lower belt face which contacts the edges of the flat elements has a layer of soft material, such as sponge rubber, which absorbs the pressure exerted by tiles with differences in height that can exist between the different pieces of tile. The upper belt extends to the zone of the roller table for delivery of the tiles thereto for subsequent strapping together by a strapping machine.

1 Claim, 1 Drawing Figure

U.S. Patent  Jul. 8, 1986  4,598,532
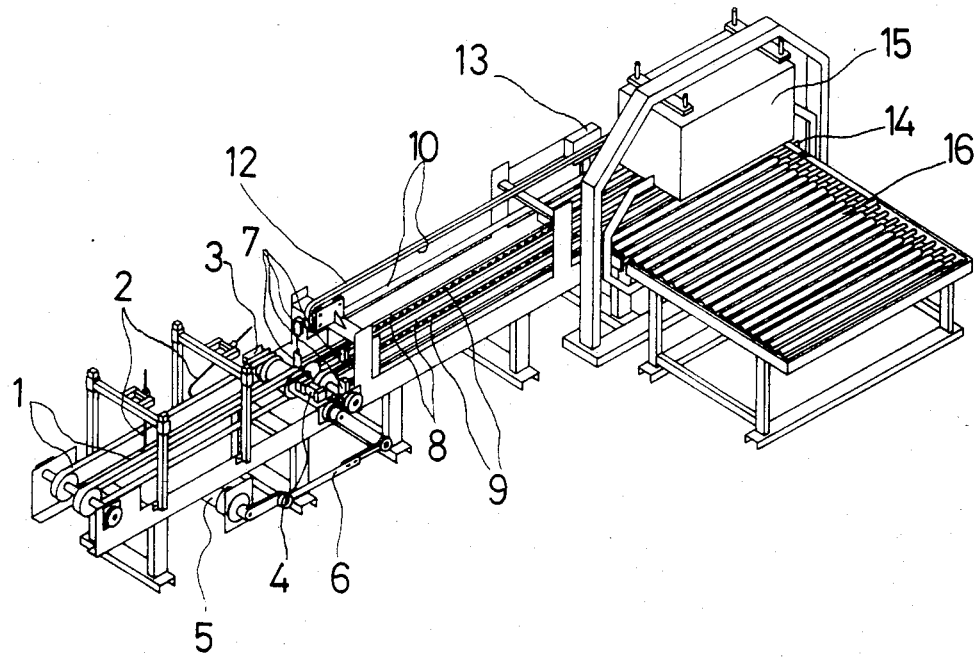

APPARATUS FOR FORMING FLAT ELEMENTS, SUCH AS TILES, INTO PACKAGES

BACKGROUND AND SUMMARY OF THE INVENTION

The present invention relates to an improved apparatus for forming flat elements, such as tiles and the like, into packages.

The invention includes a linear conveyor belt above which there is mounted an automatic reciprocating turning device which turns the flat elements moved by the conveyor belt to face forward. At the end of the conveyor belt, there is a first clamp loader which presses the flat elements and transfers them from a horizontal position to a vertical position, dropping them in this vertical position onto a horizontal dual conveyor, situated next to the first clamp loader. The dual conveyor is moved in an intermittent forward movement. Thus, the flat elements are arranged laterally in pairs and grouped in packages on a roller table.

The improvements incorporated in this type of apparatus are further described in this specification.

The upper belt of the horizontal dual conveyor, moves at the same speed as the belts below it and maintains the tiles forming the package in a vertical orientation. A layer of soft material, such as sponge rubber, is disposed on the face of the upper belt and contacts the edge of the flat elements, thereby providing a flexible cushion to absorb any slight pressure caused by the differences in height which can exist among the different pieces of tile.

The upper belt extends to the front side of the roller table and accompanies the grouped pieces of tile to said front side position.

The layer of soft material is narrower than the upper belt itself to which it is applied and is centered thereon. The layer of soft material forms two free edges of the belt in the form of lateral sides along which, by means of a mechanical clamp placed at the height of the roller table, the belt is pulled and is raised upwardly at the roller table, to permit the package of the pieces to be released from the dual conveyor. For this purpose, there is a stop to limit the extent to which the upper belt is raised.

The lower belts of the conveyor, which move the pieces of tile in a vertical position, are provided along their entire length, including the roller table, with an underlying support, in the nature of either rollers or pulleys to prevent undue friction.

There is provided a second vertically oriented clamp loader, mounted behind the first clamp loader on a carriage which moves forward and backward to stabilize the position of the vertically oriented tile pieces when they are released by the first clamp loader. The second clamp loader then moves forward and its clamps are closed when picking up each tile piece. The second clamp loader then returns to its original position. These steps are repeated until the package is full of the tile pieces which were placed on the dual conveyor. During this displacing movement of the tile pieces, the dual conveyor is operated, moving a space equal to the width of one piece of tile to make room for the following piece of tile.

The arrangement, at the front side of the roller table, includes a cutter movable synchronously with the initiation of the movement along the roller table of the formed package. The cutter constitutes a guide for one side of the package until the package is strapped. The end of the next package being formed is retained by the cutter until the upper belt of the dual conveyor descends to its normal position out of the way of the cutter.

BRIEF DESCRIPTION OF THE DRAWING

For a better understanding of the invention, there is a FIGURE which illustrates a perspective view of the apparatus incorporating the improvements.

DETAILED DESCRIPTION OF THE PREFERRED EMBODIMENT

Referring to the drawing, there is shown the horizontal dual conveyor belt 1, a turning device 2 to face the pieces toward each other in the same direction, a first clamp loader 3 which groups the pieces, a pneumatic actuator 4 for the clamp loader 3, a motor 5 for the hinged arm 6, a second clamp loader 7, lower belts 8 of a second conveyor, pulleys 9 for turning these lower belts 8, an upper belt 10 parallel to the lower belts 8, a support for one end of the upper belt 10, a flexible band 12 incorporated in the upper belt 10, a mechanical clamping element 13 which eventually raises the upper belt 10 out of the way so that the package of tiles may be released, a movable cutter 14, a strapping machine 15, and a roller table 16.

In accordance with the aforegoing description, it can be seen that the arrangement of the elements constituting the improvements has advantages for the type of apparatus described simplifying the mechanical operations of grouping the manipulated flat elements which are ready to be packaged.

I claim:

1. An apparatus for forming flat elements, into packages, comprising:
   a linear belt means for conveying flat elements in a downstream direction;
   means, mounted above the linear belt means, for turning the flat elements;
   a first means, positioned at a discharging end of the linear belt means, for reorienting said flat elements from a horizontal orientation to a vertical orientation;
   dual conveyor means, situated next to the reorienting means, for receiving the flat elements in a vertical orientation from the reorienting means and for rearranging the flat elements faced in pairs and grouped in packages with an intermittent forward movement;
   said dual conveyor means having an upper belt and lower belts which move at the same speed and which maintain the flat elements in said vertical orientation therebetween;
   said upper belt of the dual conveyor means having its face, which contacts upper edges of the flat elements, provided with a layer of soft material that absorbs pressure exerted by the flat elements having differences in height which may exist among different pieces;
   said layer of soft material, provided on the face of the upper belt, being narrower than the upper belt itself and being centered thereon so that two lateral sides are formed along the upper belt;
   a roller table means, located at a discharging end of the dual conveyor means, for receiving the flat elements faced in pairs and grouped in packages;

mechanical clamp means, placed above the roller table means, for pulling the upper belt along the two lateral sides thereof and for raising the upper belt when the flat elements faced in pairs and grouped in packages reach the roller table means so that said flat elements are released from the dual conveyor means;

means, mounted above the roller table means, for strapping together a predetermined number of the flat elements faced in pairs and grouped in packages after being released by the mechanical clamp means;

cutter means, movable synchronously with movement of the flat elements faced in pairs and grouped in packages along the roller table means, for guiding one side of one predetermined number of the flat elements until said predetermined number is strapped together by the strapping means, while simultaneously retaining another predetermined number of the flat elements for strapping together next by the strapping means;

means, provided underneath the dual conveyor means and the roller table means, for supporting the lower belts along their entire length so that undue friction is prevented; and a second means, positioned at a receiving end of the dual conveying means, for assisting the first reorienting means positioned at the discharging end of the linear belt means in transferring the flat elements from the linear belt means to the dual conveyor means in a vertical orientation.

* * * * *